Patented Jan. 7, 1947

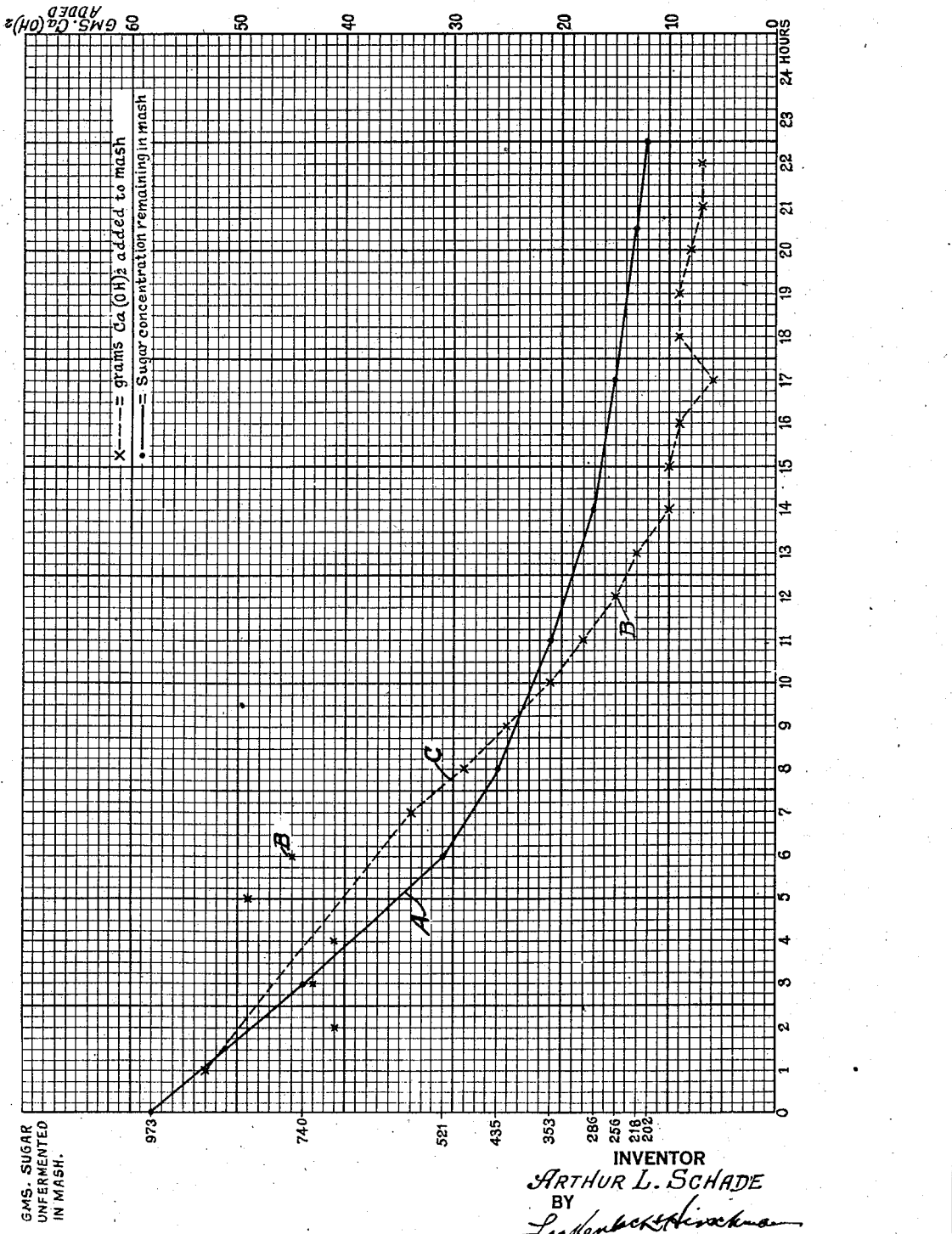

2,413,699

UNITED STATES PATENT OFFICE 2,413,699

PROCESS FOR THE FERMENTATION OF IMPURE SUGAR SOLUTIONS

Arthur L. Schade, New York, N. Y., assignor to The Overly Bio-Chemical Research Foundation, Inc., New York, N. Y., a corporation of New York Application July 17, 1943, Serial No. 495,146

8 Claims. (Cl. 195—38)

My invention relates to the manufacture of glycerine by the alkaline fermentation of saccharified starchy materials.

It is the general object of the invention to provide an improved method for effecting the fermentation of hydrolyzed starchy materials whereby a purified fermentation liquor is obtained from which the glycerine content can be more easily separated than heretofore.

Attempts to produce glycerine by modified alcoholic fermentation of saccharified starchy materials have not been commercially successful up to the present time. The major difficulty of the known processes has consisted in the recovery of the glycerine after the fermentation. This recovery has been seriously hampered by the fact that the known fermentation liquors contain large amounts of impurities which could not be removed economically and which gave rise to considerable loss of glycerine on heating the concentrated slops.

Among the impurities contained in the fermentation liquors resulting from the known processes are unfermentable polysaccharides, and also various proteins or protein-like substances. These materials remain in solution after the filtration of the yeast, and as the glycerine is usually recovered by distillation, these impurities become more and more concentrated in the solution in the still, and ultimately become very difficult to handle, and as a considerable portion of the glycerine remains in the still residue, the loss of glycerine in such residue becomes an important factor in the economy of the process.

A further difficulty arises by reason of the fact that the fermentation is maintained alkaline by the addition of various "steering" agents which act, among other things, to absorb the produced carbon dioxide and thereby keep the fermenting mash from passing over to the acid side. With the steering agents heretofore employed, however, the fermentation liquor contained not only the amount of steering agent required to maintain a sufficient degree of alkalinity, but also the soluble reaction products of the steering agent and carbon dioxide. The result has been that the fermentation liquor contains a very high proportion of dissolved salts, which, during the concentration of the slops and the recovery of the glycerol, continuously crystallize out.

It is accordingly a further object of the present invention to provide a fermentation process for hydrolyzed starchy materials wherein the normally soluble polysaccharides and proteins and protein-like substances are, during the course of the fermentation, converted into insoluble materials, so that they can be readily filtered off or otherwise physically separated with the yeast.

It is a still further object of the invention to provide a steered fermentation process wherein the steering agent is of limited solubility and forms an insoluble reaction product with carbon dioxide so that it precipitates out of solution during the course of the fermentation. Other objects of the invention will become apparent as the more detailed description of the invention proceeds.

I have found that the various and diverse objects of the invention can be attained by the use of calcium hydroxide as the alkalinizing or steering agent in the fermentation by yeast of saccharified starchy materials and in general of fermentable solutions containing also non-fermentable polysaccharides, and proteins and protein-like substances. Calcium hydroxide appears to present an almost ideal alkalinizing agent for complex mixtures of this type because in addition to being capable of maintaining the pH value within the preferred range of about 7.5 to about 8.9, it is able, on the one hand, to form compounds with polysaccharides and proteins and protein-like substances which are insoluble under alkaline conditions, and on the other hand to form the insoluble calcium carbonate with carbon dioxide. Consequently, the calcium hydroxide not only removes organic impurities from the fermentation liquor but at the same time prevents an accumulation of soluble salts therein. In my improved process, therefore, the glycerine is produced from saccharified starchy materials and equivalent mixtures in high yields, and at the same time the fermentation results in an at least partially purified liquor from which the glycerine can be recovered in a convenient and satisfactory manner.

The expression "starchy materials" refers to all those natural plant products which contain starch as the major constituent. This includes farm crops like potatoes, corn, oats, wheat, and also the fruits of trees. The starch contained in these materials is converted in known manner into soluble carbohydrates which are fermented by microorganisms like yeast. In accordance with the invention, carbohydrate solutions produced in this way are subjected to a fermentation in the presence of controlled amounts of calcium hydroxide. The calcium hydroxide is added continuously or discontinuously during the period of fermentation at such rates as to maintain an alkaline reaction throughout, the pH value of the solution being preferably kept within a range of about 7.5 to about 8.9. The reactions which occur are of a complex nature, involving the influence of the dissolved portion of the calcium hydroxide on the interplay of the enzymes which are responsible for the fermentation, the reaction of the calcium hydroxide with any acetaldehyde formed in the modified course of the fermentation, the binding of carbon dioxide, first by adsorption and subsequently by a neutralizing reaction with the calcium hydroxide, and, in addition, the formation of insoluble compounds with polysaccharides and proteins. These latter include chemical combinations of calcium hydroxide with these organic substances, and combinations held together by forces of adsorption which render polysaccharides and proteins substantially insoluble under the conditions existing in the fermenting liquor. After the period of fermentation is over, the insoluble matter is removed by one of the known methods, for example, by filtering or centrifuging. Usually, the insoluble matter, comprising large amounts of the calcium carbonate and yeast, is in a form in which it can easily be separated from the solution. The solution contains the various organic products of the fermentation, including alcohol, aldehyde, acetic acid in the form of calcium acetate and the glycerine, which are recovered from the solution after it has been slightly acidified, for example to a pH value of between about 3 and 5. The slight acidification of the solution promotes the recovery of the glycerine, and tends to reduce further difficulties arising through secondary reactions and foaming on distillation. The calcium hydroxide can be added in the form of a dry powder; it is preferable, however, to prepare a slurry of calcium hydroxide in water and regulate its flow from the storage container into the fermenting liquor. The fermenting mash is preferably agitated in any suitable manner.

The recovery from solution of the glycerine produced according to this invention is as efficient as when purified sugars are used as the raw material instead of the starchy natural materials herein employed. The insoluble material which is obtained by the interaction of the calcium hydroxide with the products of the fermentation has value not only as a neutralizing agent because of its content of calcium carbonate, but also as a source of organic materials, especially non-fermentable carbohydrates. These are present in the form of combined polymeric sugars which can be separated from their accompanying inorganic materials by acidification and then hydrolyzed to convert them into fermentable monomeric form.

The amount of calcium hydroxide which is necessary to maintain the alkaline reaction at the desired level is, in general, of the order of that quantity which can be calculated as equivalent to the amount of carbon dioxide developed during a completely alcoholic fermentation of the carbohydrates in the solution.

The period of fermentation is considerably shorter than in the known alkaline fermentations. According to this invention, 20 to 28 hours are required for 100% complete conversion by fermentation by the batch method. The amounts of calcium hydroxide (added to the fermenting mash) during this period depend upon the rate of the fermentation as will appear from the attached graph (Figure 1) illustrating average conditions. In this graph, the rate of the fermentation is shown by the plot of the amount of total sugar remaining in the mash at given hours (solid line curve A), while the amounts of calcium hydroxide added in discontinuous quantities over the same period are shown by the points B, the dotted line C indicating in a general way the gradually falling requirements of calcium hydroxide.

The following example illustrates a typical fermentation procedure in accordance with the invention, but it will be understood that the invention is not restricted thereto:

*Example.*—973 grams of total reducing sugar in the form of an 11.6% solution are produced by an acid hydrolysis of wheat flour. The fermentation is started by adding yeast and bringing the temperature up to about 30° C. After the fermentation has proceeded for a short time and 47 grams of sugar are fermented under ordinary conditions, the addition of the calcium hydroxide slurry with mechanical stirring of the solution is begun. 567 grams of calcium hydroxide in the form of a 45% slurry are added over the fermenting period of about 24 hours while the temperature is kept at 30°–34° C. and the pH value between 8.1 and 8.6. The yeast throughout this alkaline fermentation remains uncontaminated and in a healthy condition; in fact, its quantity increases. Of the total of 703.5 grams of sugars converted, 50 grams are used to produce new yeast and from the rest, 261 grams of alcohol and 98 grams of glycerine are formed. After the removal of the alcohol, and preferably after first acidifying the solution to a pH value of about 3 to 5, the glycerine is recovered from the residue in the conventional manner.

I claim:

1. Process for the manufacture of glycerine by fermentation of saccharified starchy materials, which comprises fermenting a solution of such saccharified materials which contains dissolved polysaccharides and proteins, adding calcium hydroxide to the fermenting liquor in such quantities and at such rates as to maintain an alkaline reaction during the fermentation corresponding to a pH range of about 7.5 to about 8.9, whereby insoluble calcium compounds of the polysaccharides and proteins are simultaneously formed, removing the insoluble matter from the fermented liquor, and recovering the glycerine from the so clarified solution.

2. Process for the manufacture of glycerine by fermentation of saccharified starchy materials, which comprises fermenting a solution of such saccharified materials which contains dissolved polysaccharides and proteins, adding a slurry of calcium hydroxide in water to the fermenting liquor in such quantities and at such rates as to maintain an alkaline reaction during the fermentation corresponding to a pH range of about 7.5 to about 8.9, whereby insoluble calcium compounds of the polysaccharides and proteins are simultaneously formed, removing the insoluble matter from the fermented liquor, and recovering the glycerine from the so clarified solution.

3. Process for the manufacture of glycerine by fermentation of saccharified starchy materials, which comprises fermenting a solution of such saccharified materials which contains dissolved polysaccharides and proteins, adding calcium hydroxide to the fermenting liquor in such quantities and at such rates as to maintain an alkaline reaction during the fermentation corresponding to a pH range of about 7.5 to about 8.9 whereby insoluble calcium compounds of the polysaccharides and proteins are simultaneously formed, removing the insoluble matter from the fermented liquor, acidifying the so clarified solution to bring the pH value to between 3 and 5, and recovering the glycerine from the acidified solution by distilling the same.

4. Process for the manufacture of glycerine by fermentation of saccharified starchy materials, which comprises fermenting a solution of such saccharified materials which contains dissolved disaccharides and proteins, adding to the fermenting liquor approximately the amount of calcium hydroxide equivalent to the amount of $CO_2$ to be expected from the complete alcoholic fermentation of the carbohydrates and at such rate as to maintain an alkaline reaction during the fermentation corresponding to a pH range of about 7.5 to about 8.9, whereby insoluble calcium compounds of the polysaccharides and proteins are simultaneously formed, removing the insoluble matter from the fermented liquor, acidifying the so clarified solution to bring the pH value to between 3 and 5, and recovering the glycerine from the acidified solution by distilling the same.

5. Process for the manufacture of glycerine by fermentation of saccharified starchy materials, which comprises fermenting a solution of such saccharified materials which contains dissolved polysaccharides and proteins, adding to the fermenting liquor approximately the amount of calcium hydroxide equivalent to the amount of $CO_2$ to be expected from the complete alcoholic fermentation of the carbohydrates during a period of about 24 hours and at such rate as to maintain an alkaline reaction during the fermentation corresponding to a pH range of about 7.5 to about 8.9, whereby insoluble calcium compounds of the polysaccharides and proteins are simultaneously formed, removing the insoluble matter from the fermented liquor, acidifying the so clarified solution to bring the pH value to between 3 and 5, and recovering the glycerine from the acidified solution by distilling the same.

6. Process for the manufacture of glycerine by fermentation of sugar solutions containing dissolved unfermentable polysaccharides and protein-like substances, which comprises subjecting the solution to the fermenting action of yeast while maintaining the solution alkaline within a pH range of about 7.5 to about 8.9 by the addition of calcium hydroxide to the fermenting liquor whereby insoluble calcium compounds of the polysaccharides and protein-like substances are simultaneously formed, removing the insoluble matter from the fermented liquor, and recovering the glycerine from the so clarified solution.

7. Process for the manufacture of glycerine by fermentation of sugar solutions containing dissolved unfermentable polysaccharides and protein-like substances, which comprises subjecting the solution to the fermenting action of yeast while maintaining the solution alkaline within a pH range of about 7.5 to about 8.9 by the addition of calcium hydroxide to the fermenting liquor whereby insoluble calcium compounds of the polysaccharides and protein-like substances are simultaneously formed, removing the insoluble matter from the fermented liquor, acidifying the so clarified filtrate to a pH value of about 3 to 5, and thereafter distilling the liquor for the recovery of glycerine.

8. Process for the manufacture of glycerine by fermentation of sugar solutions containing also dissolved unfermentable polysaccharides and protein-like substances, which comprises subjecting the solution to the fermenting action of yeast and, after fermentation has started, adding calcium hydroxide to the fermenting liquor to maintain the solution alkaline within a pH range of about 7.5 to about 8.9, whereby insoluble calcium compounds of the polysaccharides and protein-like substances are simultaneously formed, removing the insoluble matter from the fermented liquor, acidifying the so clarified filtrate to a pH value of about 3 to 5, and thereafter distilling the liquor for the recovery of glycerine.

ARTHUR L. SCHADE.